(12) United States Patent
Prajapati et al.

(10) Patent No.: US 9,179,472 B2
(45) Date of Patent: Nov. 3, 2015

(54) DYNAMIC AGGREGATION FOR COEXISTENCE BETWEEN WIRELESS TRANSCEIVERS OF A HOST DEVICE

(71) Applicant: BROADCOM CORPORATION, Irvine, CA (US)

(72) Inventors: Sudhirkumar Jasubhai Prajapati, Bangalore (IN); Neeraj Bhoja Poojary, Santa Clara, CA (US); Gabriel Marc Desjardins, San Francisco, CA (US); Sanjay Saha, Bangalore (IN); Sachin Gupta, Bangalore (IN); Prasanna Prakash Desai, Elfin Forest, CA (US); Pawan Kumar, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 14/084,850

(22) Filed: Nov. 20, 2013

(65) Prior Publication Data
US 2015/0131541 A1 May 14, 2015

Related U.S. Application Data

(60) Provisional application No. 61/904,104, filed on Nov. 14, 2013.

(51) Int. Cl.
*H04W 72/12* (2009.01)
*H04W 88/06* (2009.01)
*H04W 36/06* (2009.01)
*H04W 72/04* (2009.01)
*H04W 84/12* (2009.01)

(52) U.S. Cl.
CPC .......... *H04W 72/1215* (2013.01); *H04W 88/06* (2013.01); *H04W 36/06* (2013.01); *H04W 72/0406* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,826,459 | B2 * | 11/2010 | Xhafa et al. | 370/395.5 |
| 8,160,505 | B2 * | 4/2012 | Yoshimura | 455/69 |
| 8,218,468 | B2 * | 7/2012 | Fischer | 370/312 |
| 8,473,732 | B2 * | 6/2013 | Ptasinski et al. | 713/150 |
| 8,599,737 | B2 * | 12/2013 | Huang et al. | 370/315 |
| 8,879,580 | B2 * | 11/2014 | Xhafa et al. | 370/473 |
| 2005/0271019 | A1 * | 12/2005 | Yuan et al. | 370/338 |
| 2009/0067396 | A1 * | 3/2009 | Fischer | 370/338 |
| 2009/0232124 | A1 * | 9/2009 | Cordeiro et al. | 370/349 |
| 2009/0258607 | A1 * | 10/2009 | Beninghaus et al. | 455/77 |
| 2010/0316150 | A1 * | 12/2010 | Amini et al. | 375/260 |
| 2011/0111708 | A1 * | 5/2011 | Tu et al. | 455/82 |
| 2012/0057471 | A1 * | 3/2012 | Amini et al. | 370/242 |
| 2012/0084616 | A1 * | 4/2012 | Wentink | 714/748 |
| 2014/0192716 | A1 * | 7/2014 | Pantelidou et al. | 370/328 |
| 2014/0211766 | A1 * | 7/2014 | Zhao et al. | 370/336 |
| 2014/0254349 | A1 * | 9/2014 | Jia et al. | 370/225 |
| 2014/0269540 | A1 * | 9/2014 | Wang | 370/329 |
| 2014/0369329 | A1 * | 12/2014 | Lee et al. | 370/338 |
| 2015/0055516 | A1 * | 2/2015 | Smadi et al. | 370/280 |

* cited by examiner

*Primary Examiner* — Bunjob Jaroenchonwanit
(74) *Attorney, Agent, or Firm* — Garlick & Markison; Bruce E. Stuckman

(57) ABSTRACT

A circuit includes a first wireless interface circuit that communicates packetized data to a first external device in accordance with a first wireless communication protocol. A second wireless interface circuit communicates packetized data to a second external device in accordance with a second wireless communication protocol. A plurality of signal lines communicate at least four lines of cooperation data between the first wireless interface circuit and the second wireless interface circuit, wherein the cooperation data relates to cooperate transceiving in a common frequency spectrum.

19 Claims, 8 Drawing Sheets

DYNAMIC AGGREGATION FOR COEXISTENCE BETWEEN WIRELESS TRANSCEIVERS OF A HOST DEVICE

CROSS-REFERENCE TO RELATED APPLICATIONS

This application claims priority under 35 U.S.C. 119(e) to the provisionally filed application entitled, DYNAMIC AGGREGATION FOR COEXISTENCE BETWEEN WIRELESS TRANSCEIVERS OF A HOST DEVICE, having application Ser. No. 61/904,104 and filed on Nov. 14, 2013, the contents of which are incorporated herein by reference for any and all purposes.

BACKGROUND

1. Technical Field

This application relates generally to wireless communication systems and to cooperative transceiving by wireless transceivers of the same host device.

2. Description of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

DETAILED DESCRIPTION

Figure 1:
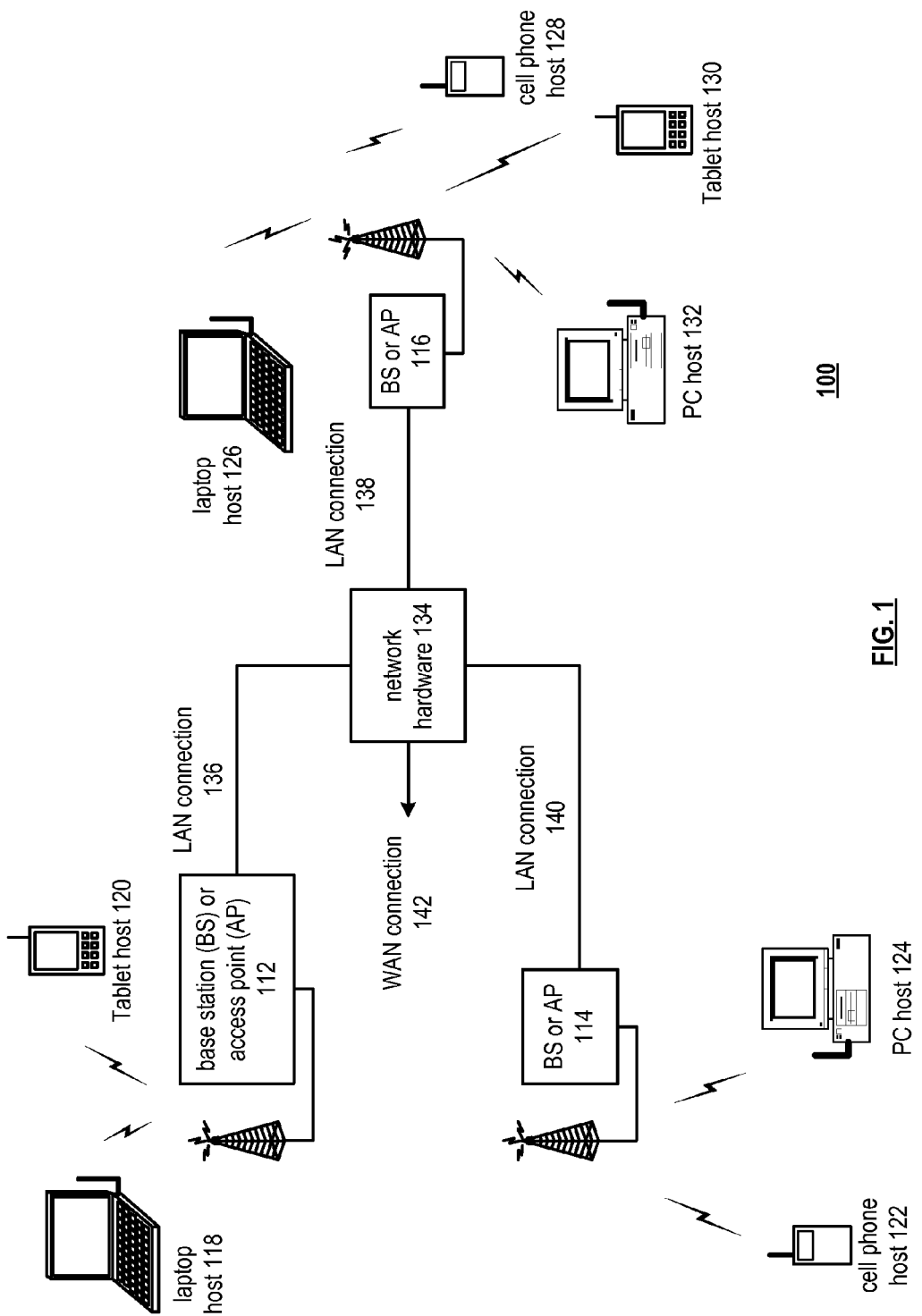
FIG. 1 is a schematic block diagram of a wireless communication system in accordance with various embodiments.

FIG. 1 is a schematic block diagram of a wireless communication system in accordance with various embodiments. A communication system 100 includes a plurality of base stations and/or access points 112, 114 and 116, a plurality of wireless communication devices 118, 120, 122, 124, 126, 128, 130 and 132 and a network hardware component 134. The wireless communication devices 118, 120, 122, 124, 126, 128, 130 and 132 may be laptop host computers 118 and 116, tablet hosts 120 and 130, personal computer hosts 124 and 132, cellular telephone hosts 122 and 128 and/or other wireless devices.

The base stations or access points 112, 114 and 116 are operably coupled to the network hardware 134 via local area network connections 136, 138 and 140. The network hardware 134, which may be a router, switch, bridge, modem, system controller, et cetera, provides a wide area network connection 142 for the communication system 100. Each of the base stations or access points 112, 114 and 116 has an associated antenna or antenna array to communicate with the wireless communication devices in its area. Typically, the wireless communication devices register with a particular base station or access point 112, 114 or 116 to receive services from the communication system 100. For direct connections (i.e., point-to-point communications), wireless communication devices communicate directly via an allocated channel.

Typically, base stations are used for cellular telephone systems and like-type systems, while access points are used for in-home or in-building wireless local area networks. Regardless of the particular type of communication system, each wireless communication device includes a built-in transceiver and/or is coupled to a transceiver.

In an embodiment, one or more of the communication devices 118, 120, 122, 124, 126, 128, 130 and 132 operates over an additional wireless network, such as a voice and data cellular network that shares the same spectrum or otherwise could potentially interfere with wireless communication between the base stations or access points 112, 114 and 116 and the wireless communication devices 118, 120, 122, 124, 126, 128, 130 and 132. For example, the base stations or access points 112, 114 and 116 could operate in accordance with a wireless local area network protocol such as an 802.11 protocol and one or more wireless communication devices 118, 120, 122, 124, 126, 128, 130 and 132 can be capable of cellular voice and data communications via a protocol such as Enhanced Data rates for GSM Evolution (EDGE), General Packet Radio Service (GPRS), high-speed downlink packet access (HSDPA), high-speed uplink packet access (HSUPA and/or variations thereof) 3GPP (third generation partnership project), LTE (long term evolution), UMTS (Universal Mobile Telecommunications System).

In an embodiment, a wireless communication device, such as wireless communication device 118, 120, 122, 124, 126, 128, 130 or 132, includes a first transceiver that is configured to communicate packetized data to base station of access point 112, 114 or 116 in accordance with a first wireless communication protocol. In addition, this wireless communication device includes a second wireless transceiver that is configured to communicate packetized data a different one of the base station of access point 112, 114 or 116 in accordance with a second wireless communication protocol. Further, the first wireless transceiver communicates in a first operating band via transmissions that generate interference with reception by the second wireless transceiver in a second operating band and optionally vice versa. Consider further that the second wireless communication protocol supports frame aggregation in accordance with an aggregation parameter. One example of operation is presented in conjunction with FIGS. 2 and 3.

Figure 2:
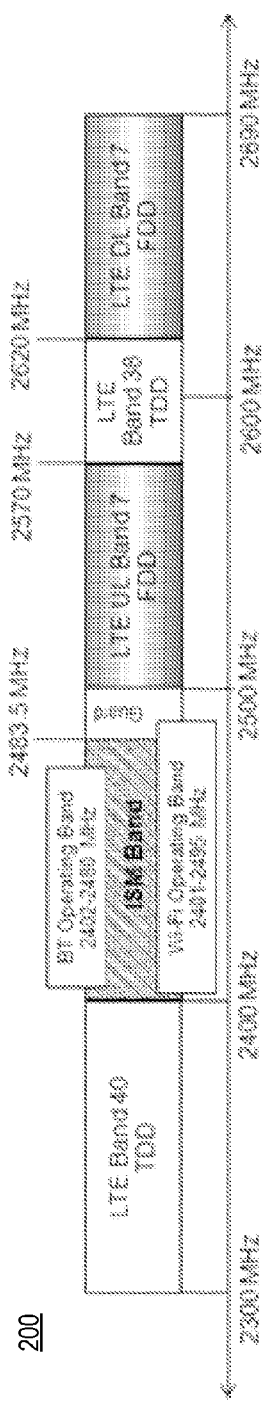
FIG. 2 is a frequency diagram that illustrates an exemplary communication in accordance with various embodiments.

FIG. 2 is a frequency diagram that illustrates an exemplary communication in accordance with various embodiments. A frequency diagram 200 is shown. In this example, one wireless transceiver of the wireless communication device 118, 120, 122, 124, 126, 128, 130 or 132, is an 802.11n compliant WLAN transceiver and another wireless transceiver of the wireless communication device 118, 120, 122, 124, 126, 128, 130 or 132 is a LTE compliant transceiver. The lower portion of ISM band is very near to LTE TDD Band 40. In LTE-WLAN coexistence, the LTE transmitter causes interference to WLAN receiver and WLAN transmitter causes interference to LTE receiver.

Figure 3:
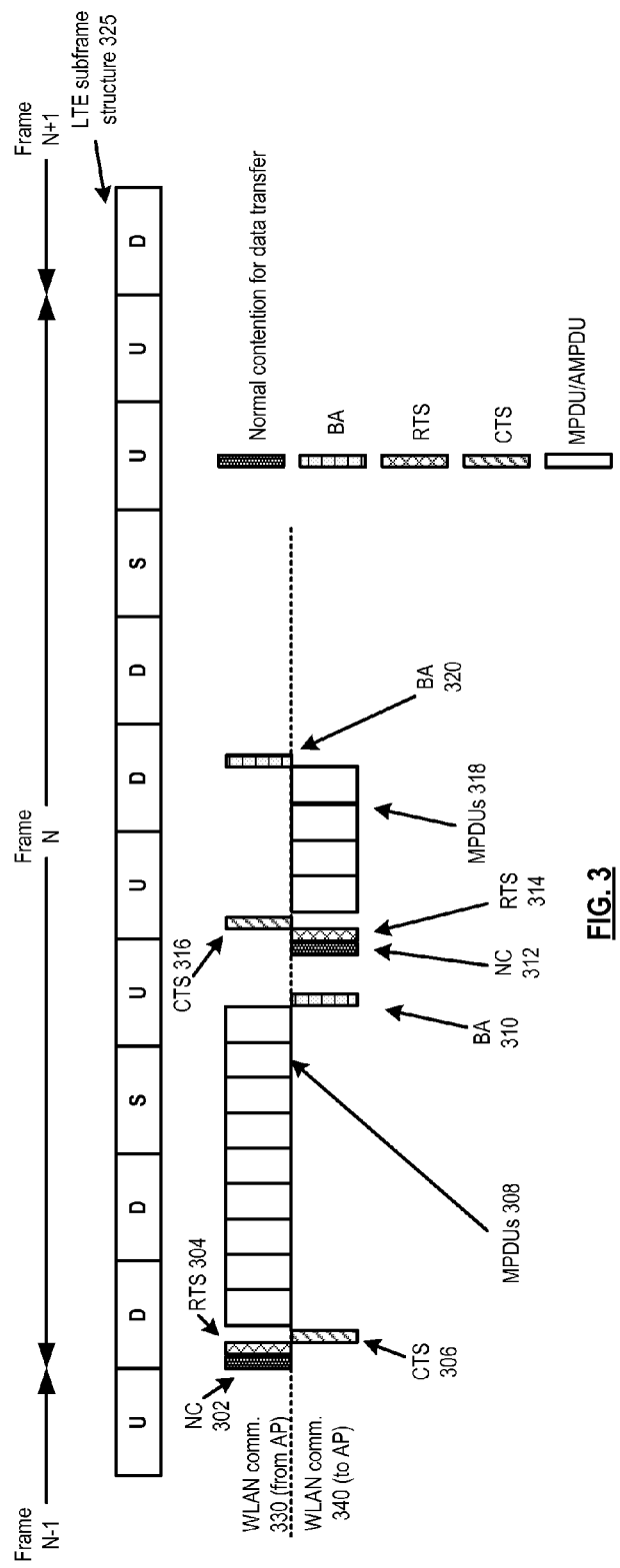
FIG. 3 is a timing diagram that illustrates an exemplary communication in accordance with various embodiments.

FIG. 3 is a timing diagram that illustrates an exemplary communication in accordance with various embodiments. In particular a timing diagram contemplates possible contemporaneous operation between LTE and WLAN transceivers discussed in the example presented in FIG. 2. A basic LTE frame structure is presented, with 5 ms or 10 ms frame periodicity, and with 10 sub-frames in each frame for communications between a BS (such as BS 112, 114 or 116) and the wireless communication device 118, 120, 122, 124, 126, 128, 130 or 132. Depending on the selected frame configuration, each sub-frame can be a DL sub-frame (D), UL sub-frame (U), or a special sub-frame (S). The special sub-frame consists of (DwPTS, Guard Period, and UpPTS). One possible LTE subframe structure 325 is shown.

In addition, example WLAN communications are also presented between an AP (such as AP 112, 114 or 116) and the wireless communication device 118, 120, 122, 124, 126, 128, 130 or 132 and are separated into communication 330 from the AP and communications 340 to the AP. With LTE TDD frames as illustrated, WLAN gets ~2.3 ms of the LTE Tx and 2.7 ms of the LTE Rx duration. With the full frame aggregation level of 16, typically from MCS7-MCS4 rate transmit duration is ~3.3 ms to ~3.8 ms. So it is very likely that part of the WLAN Rx will fall under LTE_TX and part of WLAN Tx will fall under LTE_RX as shown.

In particular, a first communication exchange begins with a normal contention for data transfer (NC) 302 and request to send (RTS) 304 by the access point and a clear to send (CTS) 306 by the wireless communication device. In the example shown, frame aggregation has been established and an aggregated MAC protocol data unit (A-MPDU) containing 9 MAC protocol data units MPDUs 308 are sent by the AP to the wireless communication device. However, the last two MPDUs of the A-MPDU 308 are not correctly received and decoded due to concurrent LTE transmit, and the block acknowledgement (BA) 310 only acknowledges the first 7 MPDUs. In the next group of communications, the wireless communications device sends NC 312 and RTS 314 and receives a CTS 316 from the AP. The wireless communication device attempts to send an A-MPDU having 4 MPDUs 318, however, transmission of the last two are cancelled due to protection of the LTE receive period. In this case, the BA 320 from the AP contains only the first two MPDUs 318. These failures will cause rate drop and hence more duration for the next packets causing further rate drop and ultimately could result in throughput halt.

While particular coexistence scenarios are presented in the examples presented in conjunction with FIGS. 2 and 3, other coexistence issues can exist in other scenarios and with other transceivers that operate in accordance with other wireless communication protocols in shared or adjacent frequency bands or other interference conditions. The discussion above is meant to be illustrative of the type of issues that can be faced by such devices and not an exhaustive list of all coexistence issues that can be addressed within the broad scope of the various embodiments In an embodiment, the wireless communication device 118, 120, 122, 124, 126, 128, 130 and 132 and AP (12, 14 or 116) operates to dynamically control the aggregation to enable more efficient coexistence and greater throughput in the presence of potential interference. The wireless communication devices 118, 120, 122, 124, 126, 128, 130 and 132 include one or more features of various embodiments addressing coexistence issues that will be described in greater detail with reference to FIGS. 4-9 that follow.

Figure 4:
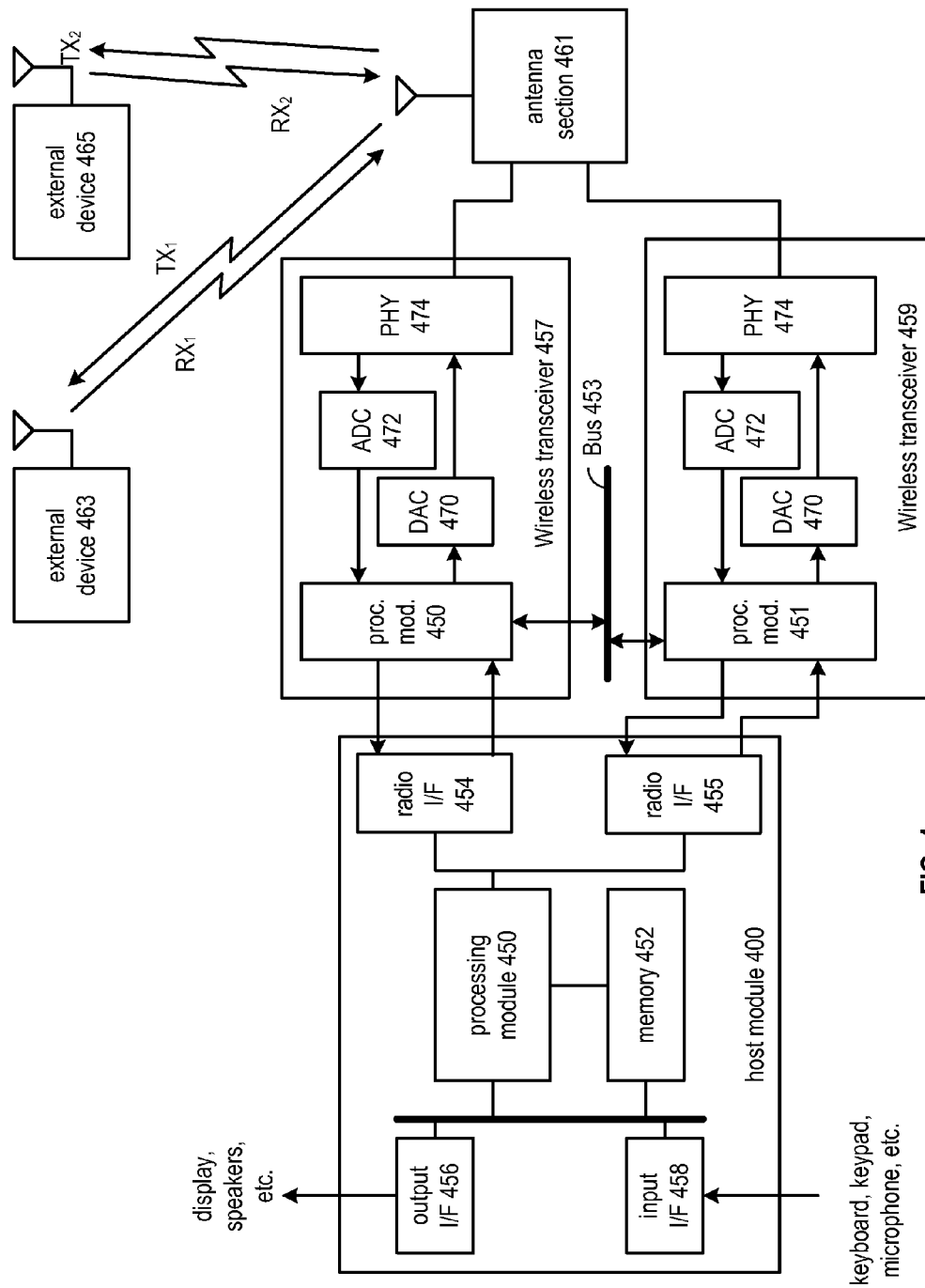
FIG. 4 is a schematic block diagram of a wireless communication device in accordance with various embodiments.

FIG. 4 is a schematic block diagram of a wireless communication device in accordance with various embodiments. A wireless communication device is presented, such as any of the wireless communications devices 118, 120, 122, 124, 126, 128, 130 and 132. The wireless communications device includes the host module 400 and at least two wireless transceivers, 457 and 459. The wireless transceivers 457 and 459 can be wireless interface circuits that are implemented separately or in a single integrated circuit that is externally coupled to the host module 400, or part of a common integrated circuit that includes host module 400. As illustrated, the host module 400 includes a processing module 450, memory 452, radio interfaces 454 and 455, input interface 458 and output interface 456. The processing module 450 and memory 452 execute the corresponding instructions that are typically performed by the host device. For example, for a cellular telephone host device, the processing module 450 performs the corresponding communication functions in accordance with a particular cellular telephone standard.

The radio interfaces 454 and 455 each communicate with a processing module 450 or 451 of the corresponding wireless transceiver 457 or 459. These processing modules include a media-specific access control protocol (MAC) layer module and other processing functionality to support the features and functions of the particular wireless protocol employed by the wireless access device and further to perform additional functions and features described herein. The processing modules 450 and 451 may be implemented using a shared processing device, individual processing devices, or a plurality of processing devices.

The wireless transceivers 457 and 459 further include a digital-to-analog converter (DAC) 472, an analog to digital converter (ADC) 470, and a physical layer module (PHY) 474. The radio interfaces 454 and 455 allow data to be received from and sent to external devices 463 and 465 via the wireless transceivers 457 and 459. Each of the external devices includes its own wireless transceiver for communicating with the wireless interface device of the host device. For example, the external devices 463 and 465 can include a base station or access point 112, 114 or 116.

For data received from one of the wireless transceivers 457 or 459 (e.g., inbound data), the radio interface 454 or 455 provides the data to the processing module 450 for further processing and/or routing to the output interface 456. The output interface 456 provides connectivity to an output display device such as a display, monitor, speakers, et cetera such that the received data may be displayed. The radio interfaces 454 and 455 also provide data (outbound data) from the processing module 450 to the wireless transceivers 457 and 459. The processing module 450 may receive the outbound data from an input device such as a keyboard, keypad, microphone, et cetera via the input interface 458 or generate the data itself. For data received via the input interface 458, the processing module 450 may perform a corresponding host function on the data and/or route it to one of the wireless transceivers 457 or 459 via the corresponding radio interface 454 or 455.

In operation, to mitigate interference between the two or more wireless transceivers 457 and 459 of the wireless communication device, the processing modules 450 and 451 of each wireless transceiver 457 and 459 communicate with each other via a bus 453, to coordinate their activities. In an embodiment, the bus 453 is a high speed data bus or other interface that bidirectionally communicates cooperation data between the wireless transceivers 457 and 459, wherein the cooperation data relates to cooperative transceiving in a similar, and/or otherwise interfering or common frequency spectrum. For example, the cooperation data can includes cooperative scheduling, and timing information of transmit and receive periods, transceiver status, such as active, inactive, and sleep mode conditions as well as other status messages that can be used by the other transceiver to enhance coexistence and/or to avoid interference.

Consider an example where the wireless transceiver 457 is configurable to communicate packetized data to an external device 463 in accordance with a first wireless communication protocol. Further, the wireless transceiver 459 is configurable to communicate packetized data to the external device 465 in accordance with a second wireless communication protocol wherein the first wireless transceiver communicates in a first operating band via transmissions that generate interference with reception by the second wireless transceiver in a second operating band. Consider further that the second wireless communication protocol supports aggregation in accordance with an aggregation parameter.

Following the example presented in conjunction with FIGS. 2 and 3, wireless transceiver 459 is an 802.11n compliant WLAN transceiver and wireless transceiver 457 is a LTE transceiver. Cooperation data share via bus 453 can indicate to the wireless transceiver 459 that the wireless transceiver 457 is inactive, asleep or otherwise is not actively engaged in ongoing communications with external device 463 or is only engaged in minimal communications to preserve the link between the wireless transceiver 457 and the external device 463. In this case, the wireless transceiver 459 is configurable to cooperatively establish a first block acknowledgment session with the external device 465 in accordance with a high value of the aggregation parameter. The wireless transceiver 459 is further operable to determine, based for example on further cooperation data, when the wireless transceiver 457 begins engaging in active communications with the external device 463 and responds by cooperatively terminating the first block acknowledgment session and further by cooperatively establishing a second block acknowledgment session with the external device 465 in accordance with a lower value of the aggregation parameter—in particular a value that promotes shorter transmissions for enhanced coexistence and that reduce the possibility of interference.

In accordance with the example above, the aggregation parameter can be an aggregation window size, an indicator of the maximum number of MPDUs that can be aggregated in a single A-MPDU, or the maximum number of MAC service data units (MSDUs) that can be aggregated in an aggregated MSDU (A-MSDU). Further other aggregation parameters in accordance with other protocols that indicate other frame aggregation levels, aggregated frame sizes or durations, receive window sizes, or that otherwise indicate an amount of aggregation, can likewise be employed.

Figure 5:
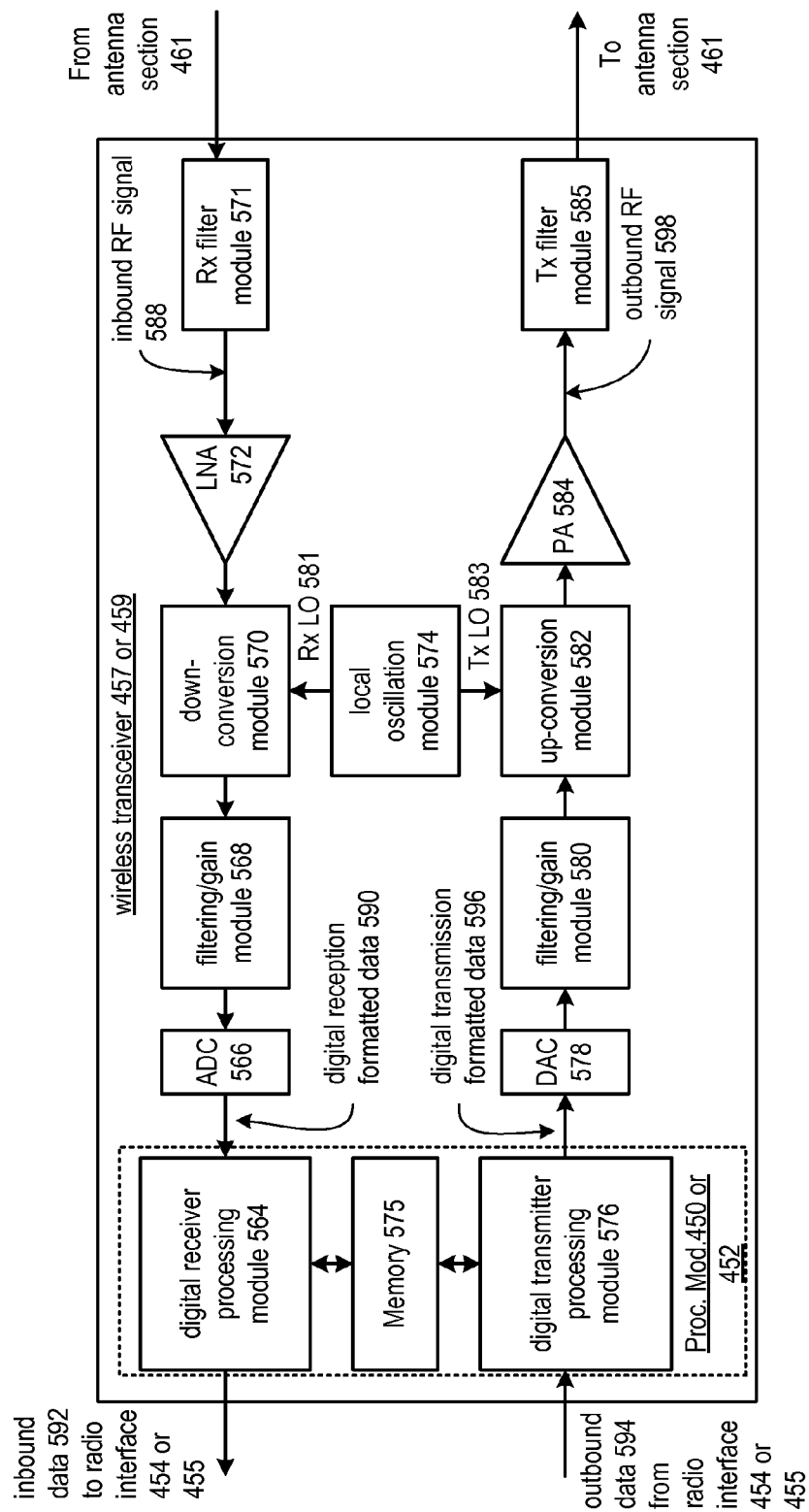
FIG. 5 is a schematic block diagram of a wireless transceiver in accordance with various embodiments.

FIG. 5 is a schematic block diagram of a wireless transceiver in accordance with various embodiments. In particular, a wireless transceiver 457 or 459 is shown that includes digital receiver processing module 564, an analog-to-digital converter (ADC) 566, a filtering/attenuation module 568, an IF mixing down conversion stage 570, a receiver filter 571, a low noise amplifier 572, a local oscillation module 574, memory 575, a digital transmitter processing module 576, a digital-to-analog converter (DAC) 578, a filtering/gain module 580, an IF mixing up conversion stage 582, a power amplifier 584, and a transmitter filter module 585. The wireless transceiver 457 or 459 is coupled to the antenna section 461 that is coupled to the transmit and receive paths. The antenna section 461 can include separate antennas, a phased array, a shared antenna, a duplexer and/or an antenna switch. As one of average skill in the art will appreciate, the antenna(s) may be polarized, directional, and be physically separated to provide a minimal amount of interference.

Returning to the discussion of FIG. 4, the digital receiver processing module 564 the digital transmitter processing module 576, and the memory 575 may be included in the processing module 450 or 452 and execute digital receiver functions and digital transmitter functions in accordance with a particular wireless communication standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 564 and 576 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 575 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 564 and/or 576 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the wireless interface device 457 or 459 receives outbound data 594 from the radio interface 454 or 455. The digital transmitter processing module 576 processes the outbound data 594 in accordance with a particular wireless communication standard (e.g., IEEE 802.11 including all current and future subsections, LTE or other wireless communication protocol) to produce digital transmission formatted data 596. The digital transmission formatted data 596 can be a digital base-band signal or a digital low IF signal, where the low IF typically will be in the frequency range of one hundred kilohertz to a few megahertz.

The digital-to-analog converter 578 converts the digital transmission formatted data 596 from the digital domain to the analog domain. The filtering/gain module 580 filters and/or adjusts the gain of the analog signal prior to providing it to the IF mixing stage 582. The IF mixing stage 582 directly converts the analog baseband or low IF signal into an RF signal based on a transmitter local oscillation 583 provided by local oscillation module 574. The power amplifier 584 amplifies the RF signal to produce outbound RF signal 598, which is filtered by the transmitter filter module 585. The antenna section 461 transmits the outbound RF signal 598 to a targeted device such as a base station, an access point, peripheral and/or another wireless communication device.

The wireless interface device 457 or 459 also receives an inbound RF signal 588 via the antenna section 461, which was transmitted by a base station, an access point, or another wireless communication device. The antenna section 461 provides the inbound RF signal 588 to the receiver filter module 571. The Rx filter 571 bandpass filters the inbound RF signal 588. The Rx filter 571 provides the filtered RF signal to low noise amplifier 572, which amplifies the signal 588 to produce an amplified inbound RF signal. The low noise amplifier 572 provides the amplified inbound RF signal to the IF mixing module 570, which directly converts the amplified inbound RF signal into an inbound low IF signal or baseband signal based on a receiver local oscillation 581 provided by local oscillation module 574. The down conversion module 570 provides the inbound low IF signal or baseband signal to the filtering/gain module 568. The filtering/gain module 568 filters and/or gains the inbound low IF signal or the inbound baseband signal to produce a filtered inbound signal.

The analog-to-digital converter 566 converts the filtered inbound signal from the analog domain to the digital domain to produce digital reception formatted data 590. The digital receiver processing module 564 decodes, descrambles, demaps, and/or demodulates the digital reception formatted data 590 to recapture inbound data 592 in accordance with the particular wireless communication standard being implemented by wireless interface device. The recaptured inbound data 592 is provided to the radio interface 454 or 455.

While FIG. 5 might otherwise imply that the wireless interface devices 457 and 459 are implemented with separate components, one or more modules or components of these devices can be implemented with shared components that perform for both wireless interface devices. For instance, a single LNA 572 and RX filter module 571 can be used by wireless interface devices 457 and 459 to filter and amplify inbound RF signals, a signal reference oscillator can be used in local oscillation modules 574 of both wireless interface devices as the basis for generating separate local oscillation signals 581 and 583, et cetera.

Figure 6:
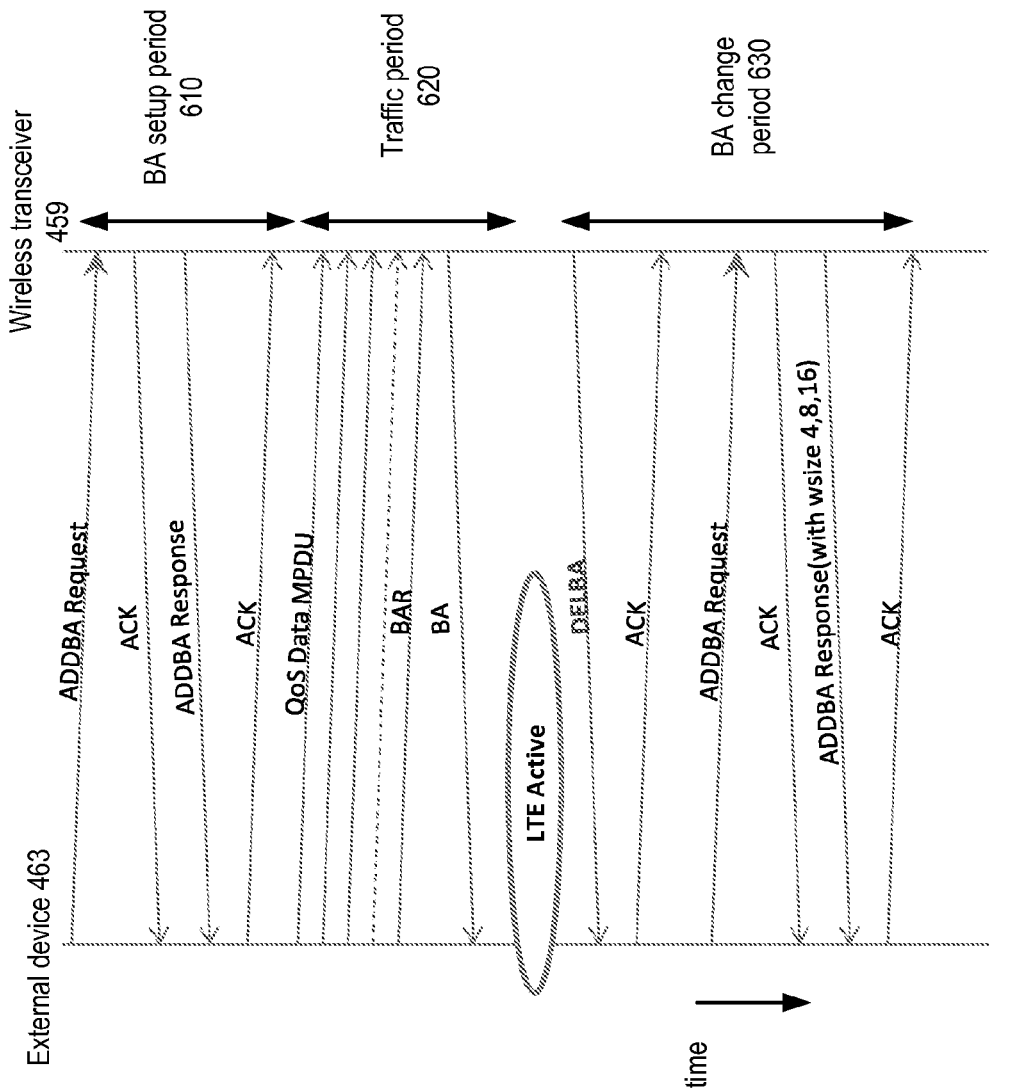
FIG. 6 is a timing diagram that illustrates an exemplary communication in accordance with various embodiments.

FIG. 6 is a timing diagram that illustrates an exemplary communication in accordance with various embodiments. In particular a timing diagram is presented that provides further illustration of the example where wireless transceiver 459 is an 802.11n compliant WLAN transceiver and wireless transceiver 457 is an LTE compliant transceiver. In particular, communications are shown between external device 465, such as an AP 112, 114 or 116, and the wireless transceiver 459.

The timing diagram begins in a state where the wireless transceiver 459 has either determined that the wireless transceiver 457 is not actively engaged in communicating with the external device 463 or otherwise that the communication status of wireless communication device 457 is unknown. This determination can be made based on cooperation data shared from the wireless transceiver 457 that there is no scheduled communication, that the device is dormant, asleep or otherwise in a period where no communications are occurring or where no communications are expected.

In the example shown, the wireless transceiver 459 and external device 465 engage in communications during a BA setup period 610 to cooperatively establish a block acknowledgment session in accordance with a first value of the aggregation parameter. Because the wireless transceiver 457 is not engaged in communication, this first value can be a high value relative to normal, the maximum value permitted (e.g. 16 or some other value). The BA setup period 610 includes receiving an add block acknowledgment (ADDBA) request from the external device 465 and sending an acknowledgement (ACK) and an ADDBA response that includes the first value of the aggregation parameter. This block acknowledgment session includes the traffic period 620 characterized by a quality of service QoS data MPDU and a series of aggregated MPDUs, the block acknowledgement request (BAR) and block acknowledgment (BA).

When the wireless transceiver 459 determines, based for example on cooperation data, that the wireless transceiver 457 is not active, i.e. is engaged in communication with the external device 463, the wireless transceiver 459 acts to cooperatively terminate the block acknowledgment session, in response. BA change period 630 begins when the wireless transceiver 459 sends a delete block acknowledgment (DELBA) request to the external device 465 and receives an acknowledgement from the external device 465. The BA change period 630 continues with the wireless transceiver 459 and external device 465 engaging in communications to cooperatively establish a new block acknowledgment session in accordance with a second value of the aggregation parameter. Because the wireless transceiver 457 is now engaged in communication, this second value is set as lower than the first value (e.g. 4, 8 or some other value) that corresponds to smaller frame aggregation sizes. The BA change period 630 includes receiving an add block acknowledgment (ADDBA) request from the external device 465 and sending an acknowledgement (ACK) and an ADDBA response that includes the new value of the aggregation parameter.

In this fashion the wireless transceiver 459 operates to react to the presence and absence of LTE activity and further the frame configuration of the LTE activity, to dynamically decide optimum aggregation level such that both WLAN Transmit and Receive goes through within LTE_TX and LTE_RX window. At the time of WLAN association the wireless transceiver 459 can negotiate the full supported aggregation window size. Once LTE the TDD frame configuration is determined, the wireless transceiver 459 can pick the best aggregation size, based on the particular LTE frame configuration and re-negotiate for the aggregation as shown.

It should be noted, that the above description treats the external device 465 as the block acknowledgement originator and the wireless transceiver 459 as the block acknowledgement recipient. However, in other configurations the roles can be reversed.

In general, a TD-LTE Frame configuration may be completely random and can come into existence during an ongoing WLAN Frame aggregation/block acknowledgement session. When TD-LTE is detected, based on either cooperation data indicating new transmissions, communications from other devices or other detection mechanisms, and the TD-LTE frame configuration is known, an existing WLAN block acknowledgement session can be deleted using the DELBA Frame being sent from the (Block Ack Recipient). Also the aggregation level of the recipient will be modified depending on TD-LTE frame configuration. A new Block Acknowledgement session will be re-initiated by the Initiator using ADDBA Request/ADDBA Response exchanges. Responder will now advertise the changed aggregation window size (aggregation level) in the ADDBA Response.

Figure 7:
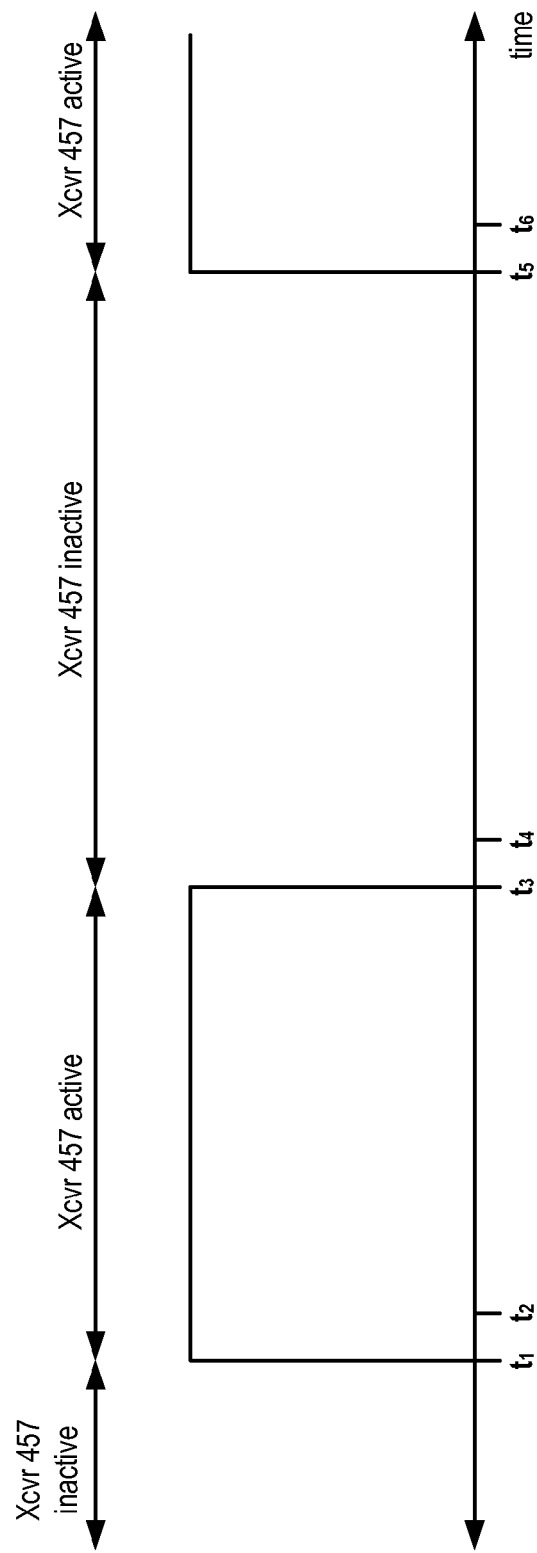
FIG. 7 is a timing diagram that illustrates an exemplary communication in accordance with various embodiments.

FIG. 7 is a timing diagram that illustrates an exemplary communication in accordance with various embodiments. In this example, wireless transceiver 457 is active (e.g. is on and is actively engaged in communication or is scheduled to be actively engaged in communications) during times t, where $t_1 < t < t_3$ and $t_5 < t$. At each transition time, $t_1$, $t_3$, $t_5$, the wireless transceiver 459 cooperatively terminates its block acknowledgment session and establishes a new block acknowledgment session to adapt to the change in activity status in the wireless transceiver 457. Between the times $t_1 < t < t_2$, $t_3 < t < t_4$ and $t_5 < t < t_6$, the old block acknowledgment session is terminated and a new block acknowledgment session is established with a new block acknowledgment value.

Consider again the example where wireless transceiver 459 is an 802.11n compliant WLAN transceiver and wireless transceiver 457 is an LTE compliant transceiver. In this case, the timing diagram can represent LTE DRX cycling. In periods $t < t_1$, and $t_3 < t < t_5$ where the wireless transceiver 457 is inactive, a maximum block acknowledgment value can be employed. Further, in periods $t > t_5$, and $t_1 < t < t_3$ where the wireless transceiver 457 is active, a lower frame aggregation value can be employed. In this fashion, for example, when a dynamic aggregation friendly LTE DRX duty cycle is in use by LTE, the wireless transceiver 459 can switch between an optimum aggregation size for periods of LTE activity and a maximum aggregation size for periods of LTE inactivity.

Figure 8:
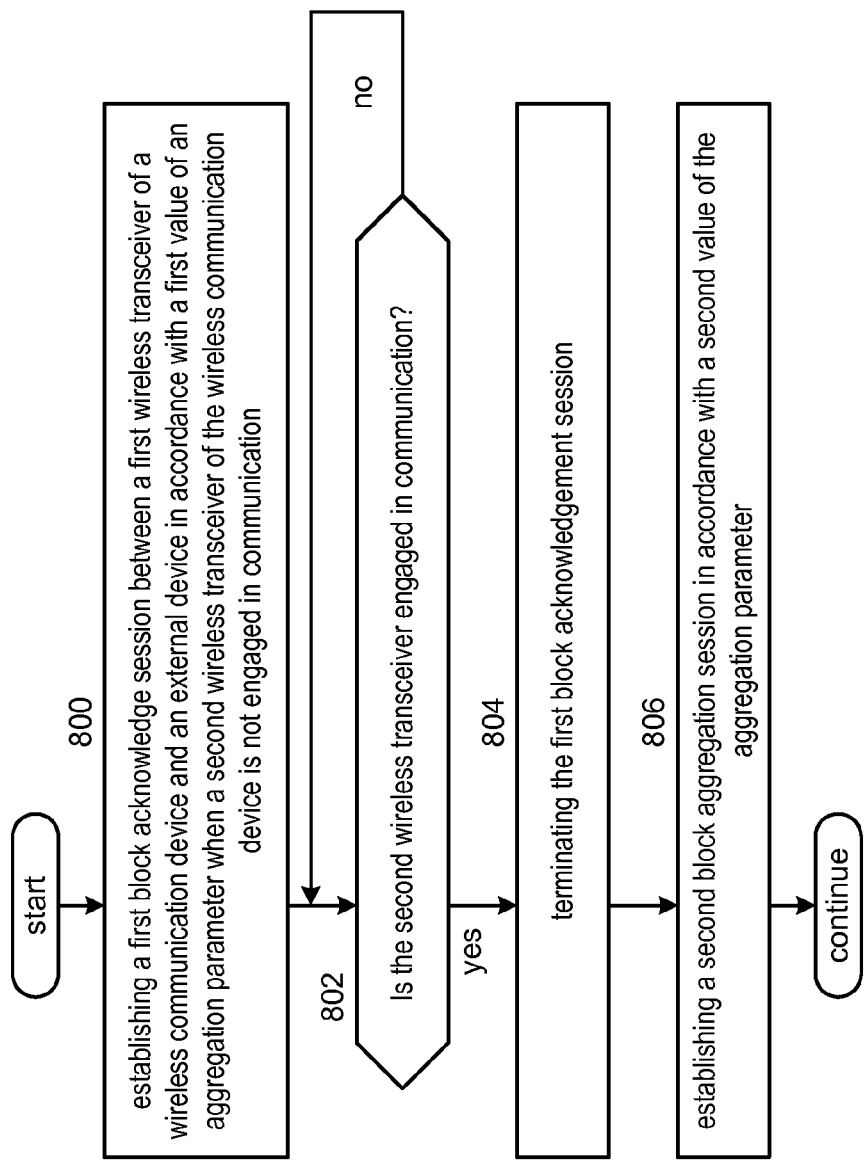
FIG. 8 is a flowchart representation of a method in accordance with various embodiments.

FIG. 8 is a flowchart representation of a method in accordance with various embodiments. In particular, a method is presented for use in conjunction with one or more functions and features described in conjunction with FIGS. 1-7. Step 800 includes establishing a first block acknowledgment session between a first wireless transceiver of a wireless communication device and an external device in accordance with a first value of an aggregation parameter when a second wireless transceiver of the wireless communication device is not engaged in communication. Step 802 includes determining if the second wireless transceiver is engaged in communication. If not, the method continues back to step 802. If so, the method proceeds to step 804 which includes terminating the first block acknowledgment session. Step 806 includes establishing a second block acknowledgment session in accordance with a second value of the aggregation parameter.

In an embodiment, the second wireless transceiver communicates in a first operating band via transmissions that generate interference with reception by the first wireless transceiver in a second operating band and further the second value of the aggregation parameter is less than the first value of the aggregation parameter. Step 800 can include: receiving a first add block acknowledgment request from the external device; and sending to the external device a first add block acknowledgment response that includes the first value of the aggregation parameter. Step 806 can include: receiving a second add block acknowledgment request from the external device; and sending to the external device a second add block acknowledgment response that includes the second value of the aggregation parameter. Step 804 can include: sending to the external device a delete block acknowledgment request; and receiving an acknowledgement from the external device.

Figure 9:
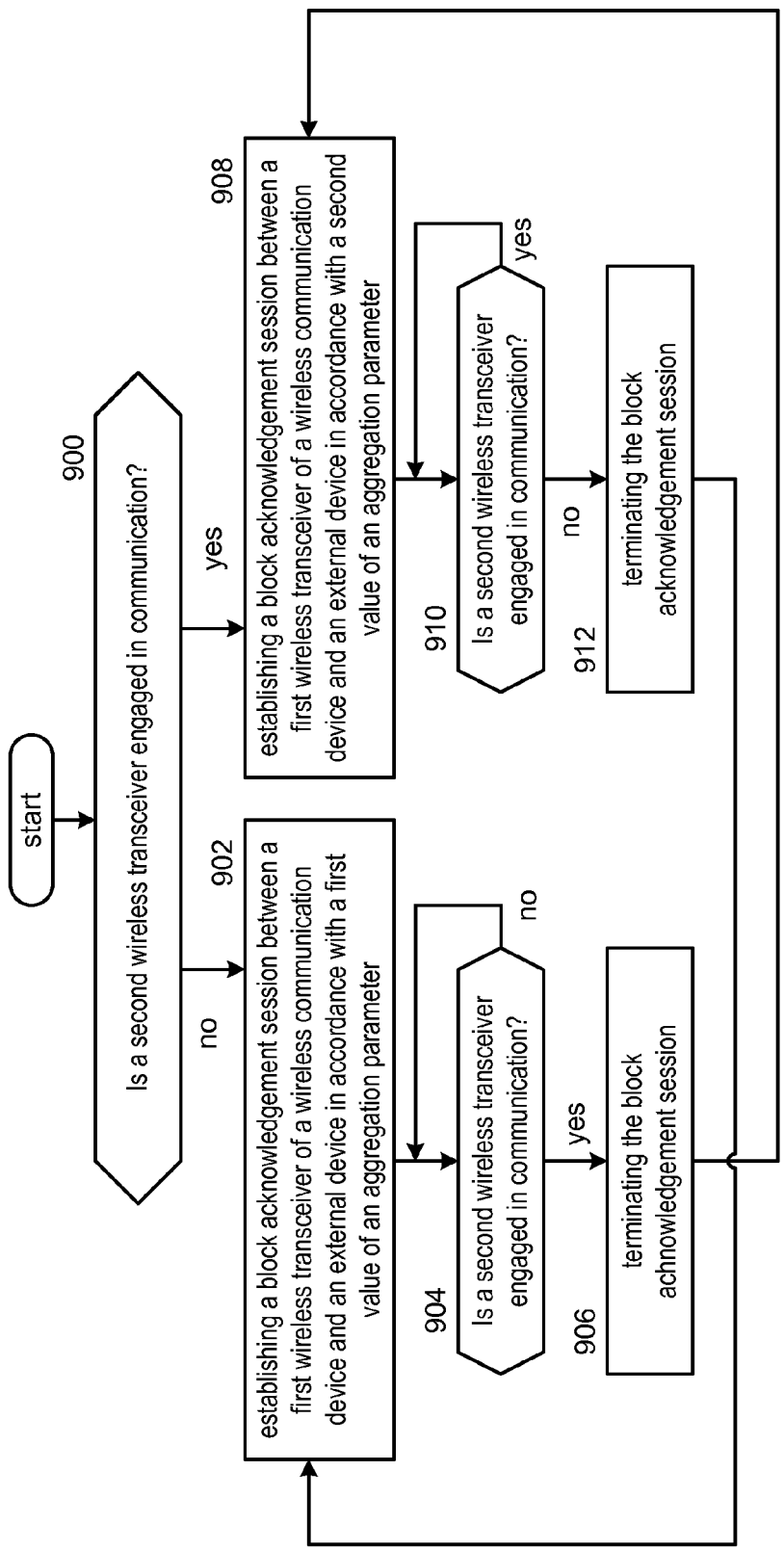
FIG. 9 is a flowchart representation of a method in accordance with various embodiments.

FIG. 9 is a flowchart representation of a method in accordance with various embodiments. In particular, a method is presented for use in conjunction with one or more functions and features described in conjunction with FIGS. 1-7. Step 900 includes determining if the second wireless transceiver is engaged in communication. If not, the method proceeds to step 902 that includes establishing a block acknowledgment session between a first wireless transceiver of a wireless communication device and an external device in accordance with a first value of an aggregation parameter. If so, the method proceeds to step 908 that includes establishing a block acknowledgment session between a first wireless transceiver of a wireless communication device and an external device in accordance with a second value of an aggregation parameter.

Step 904 includes determining if the second wireless transceiver is engaged in communication. If not, the method continues back to step 904. If so, the method proceeds to step 906 which includes terminating the first block acknowledgment and further to step 908 to set up a new session with the second value of the aggregation parameter.

Step 910 includes determining if the second wireless transceiver is engaged in communication. If so, the method continues back to step 910. If not, the method proceeds to step 912 which includes terminating the first block acknowledgment and further to step 902 to set up a new session with the first value of the aggregation parameter.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A method for use with a first wireless transceiver that communicates in a first operating band via transmissions that generate interference with reception by a second wireless transceiver in a second operating band, the method comprising:

communicating packetized data to a first external device via the first wireless transceiver of a wireless communication device in accordance with a first wireless communication protocol;

communicating packetized data to a second external device via the second wireless transceiver of the wireless communication device in accordance with a second wireless communication protocol that supports block acknowledgment in accordance with an aggregation parameter;

establishing a first block acknowledgment session between the second wireless transceiver and the second external device in accordance with a first value of the aggregation parameter when the first wireless transceiver of the wireless communication device is not engaged in communication;

determining when the first wireless transceiver is engaged in communication;

terminating the first block acknowledgment session in response to determining that the first wireless transceiver is engaged in communication; and establishing a second block acknowledgment session in accordance with a second value of the aggregation parameter when the first wireless transceiver is engaged in communication.

2. The method of claim 1 wherein the second value of the aggregation parameter is less than the first value of the aggregation parameter.

3. The method of claim 1 wherein establishing the first block acknowledgment session includes:

receiving a first add block acknowledgment request from the second external device; and sending to the second external device a first add block acknowledgment response that includes the first value of the aggregation parameter.

4. The method of claim 3 wherein establishing the second block acknowledgment session includes:

receiving a second add block acknowledgment request from the second external device; and sending to the second external device a second add block acknowledgment response that includes the second value of the aggregation parameter.

5. The method of claim 1 wherein terminating the first block acknowledgment session includes:

sending to the second external device a delete block acknowledgment request; and receiving an acknowledgment from the second external device.

6. A communication device comprises:

a first wireless transceiver configurable to communicate packetized data to a first external device in accordance with a first wireless communication protocol;

a second wireless transceiver configurable to communicate packetized data to a second external device in accordance with a second wireless communication protocol that supports block acknowledgment in accordance with an aggregation parameter, wherein the second wireless transceiver is configurable to:

establish a first block acknowledgment session in accordance with a first value of the aggregation parameter when the first wireless transceiver is not engaged in communicating with the first external device;

determine when the first wireless transceiver is engaged in communicating with the first external device;

terminate the first block acknowledgment session in response to determining that the first wireless transceiver is engaged in communicating with the first external device; and establish a second block acknowledgment session in accordance with a second value of the aggregation parameter when the first wireless transceiver is engaged in communicating with the first external device;

wherein the second value of the aggregation parameter is less than the first value of the aggregation parameter.

7. The communication device of claim 6 wherein the second wireless transceiver establishes the first block acknowledgment session by:

receiving an add block acknowledgment request from the second external device; and sending to the second external device an add block acknowledgment response that includes the first value of the aggregation parameter.

8. The communication device of claim 6 wherein the second wireless transceiver establishes the second block acknowledgment session by:

receiving an add block acknowledgment request from the second external device; and sending to the second external device an add block acknowledgment response that includes the second value of the aggregation parameter.

9. The communication device of claim 6 wherein the second wireless transceiver terminates the first block acknowledgment session by:

sending to the second external device a delete block acknowledgment request; and receiving an acknowledgment from the second external device.

10. The communication device of claim 6 wherein the first wireless communication protocol is a cellular voice and data protocol and the second wireless communication protocol is a wireless local area network protocol.

11. The communication device of claim 6 wherein the first external device is a base station and the second external device is an access point.

12. A communication device comprising:

a first wireless transceiver configurable to communicate packetized data to a first external device in accordance with a first wireless communication protocol;

a second wireless transceiver configurable to communicate packetized data to a second external device in accordance with a second wireless communication protocol that supports block acknowledgment in accordance with an aggregation parameter, wherein the second wireless transceiver is configurable to:

cooperatively establish a first block acknowledgment session in accordance with a first value of the aggregation parameter when the first wireless transceiver is not engaged in communicating with the first external device;

determine when the first wireless transceiver is engaged in communicating with the first external device;

cooperatively terminate the first block acknowledgment session in response to determining that the first wireless transceiver is engaged in communicating with the first external device; and cooperatively establish a second block acknowledgment session in accordance with a second value of the aggregation parameter when the first wireless transceiver is engaged in communicating with the first external device;

wherein the first wireless transceiver communicates in a first operating band via transmissions that generate interference with reception by the second wireless transceiver in a second operating band.

13. The communication device of claim 12 wherein the second value of the aggregation parameter is less than the first value of the aggregation parameter.

14. The communication device of claim 12 wherein the second wireless transceiver cooperatively establishes the first block acknowledgment session by:

receiving an add block acknowledgment request from the second external device; and sending to the second external device an add block acknowledgment response that includes the first value of the aggregation parameter.

15. The communication device of claim 12 wherein the second wireless transceiver cooperatively establishes the second block acknowledgment session by:

receiving an add block acknowledgment request from the second external device; and sending to the second external device an add block acknowledgment response that includes the second value of the aggregation parameter.

16. The communication device of claim 12 wherein the second wireless transceiver cooperatively terminates the first block acknowledgment session by:

sending to the second external device a delete block acknowledgment request; and receiving an acknowledgment from the second external device.

17. The communication device of claim 12 wherein the first wireless communication protocol supports a power saving protocol that cycles the first wireless transceiver between an on state to an off state and wherein the first block acknowledgment session is synchronized to the off state and the second block acknowledgment session is synchronized to the on state.

18. The communication device of claim 12 wherein the first wireless communication protocol is a cellular voice and data protocol and the second wireless communication protocol is a wireless local area network protocol.

19. The communication device of claim 12 wherein the first external device is a base station and the second external device is an access point.

* * * * *